United States Patent [19]

Duda

[11] Patent Number: 4,602,890
[45] Date of Patent: Jul. 29, 1986

[54] RATCHET ASSEMBLY AND SNAP LOCK MECHANISM THEREFOR

[75] Inventor: Henry J. Duda, Mount Prospect, Ill.

[73] Assignee: Randall Equipment Company, Mt. Prospect, Ill.

[21] Appl. No.: 704,494

[22] Filed: Feb. 22, 1985

[51] Int. Cl.$^4$ .......................... F16B 7/10; F16D 1/12
[52] U.S. Cl. ..................................... 403/105; 403/328
[58] Field of Search ....................... 403/328, 327, 105; 248/408, 409

[56] References Cited

U.S. PATENT DOCUMENTS

| | | | |
|---|---|---|---|
| 542,862 | 7/1895 | Peard | 248/408 |
| 559,368 | 5/1896 | Dieterich | 403/105 |
| 1,732,081 | 10/1929 | Clement | 249/108 X |
| 3,137,512 | 6/1964 | Carpezzi | 248/408 UX |
| 4,165,854 | 8/1979 | Duly | 403/328 X |
| 4,339,148 | 7/1982 | Smith et al. | 403/328 X |

Primary Examiner—Andrew V. Kundrat
Attorney, Agent, or Firm—Emrich & Dithmar

[57] ABSTRACT

A ratchet assembly includes telescoping inner and outer tubes, the inner tube having a row of ratchet teeth thereon. A snap lock assembly includes a tubular mounting body threadedly engaged with the outer member. A latch member is disposed within the mounting body and reciprocates between a latching position for ratcheting engagement with the ratchet teeth and an unlatching position disengaged from the ratchet teeth. A spring urges the latch member to its latching position. The latch member has an enlarged head carrying a pin which lies closely along the hexagonal outer surface of the mounting body when the latching member is in its latch position to prevent rotational movement of the latch member with respect to the mounting body. When the latch member is in its unlatching position, the pin clears the mounting body to permit rotational movement of the latch member.

14 Claims, 6 Drawing Figures

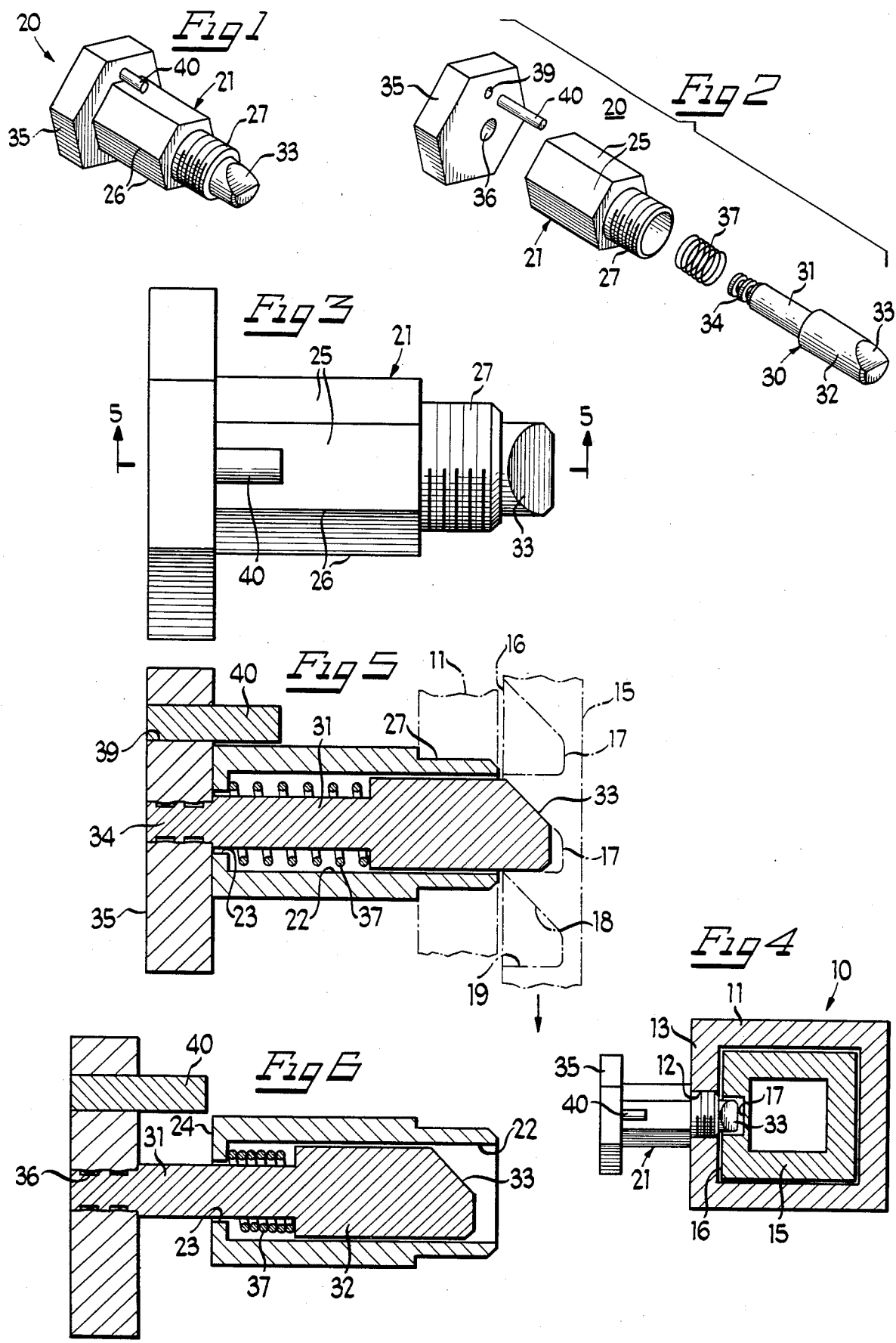

RATCHET ASSEMBLY AND SNAP LOCK MECHANISM THEREFOR

BACKGROUND OF THE INVENTION

The present invention relates to means for interlocking telescoping tubular members, and has particular application to a snap lock mechanism which operates to permit one-way ratcheting movement of the telescoping members with respect to each other.

A prior type of snap lock mechanism for a ratchet assembly includes a tubular mounted body which is threadedly engaged with the outer telescoping member and carries therewithin a latch member axially reciprocatively movable between a latching position in engagement with a set of ratchet teeth on the inner telescoping member and an unlatching position out of engagement with the ratchet teeth. The latch member has a cam surface thereon which is disposed for ratcheting engagement with the ratchet teeth when the latch member is disposed in a predetermined rotational position. An indicator on the latch member head indicates the direction in which the cam surface is facing.

In such prior ratchet assemblies, the latch member may accidentally rotate with respect to the mounting body, as a result of vibration or the like in use. Such rotation can move the cam surface on the latch member out of position for proper engagement with the ratchet teeth.

SUMMARY OF THE INVENTION

It is a general object of the present invention to provide an improved ratchet assembly and snap lock mechanism therefor which avoids the disadvantages of prior constructions while affording additional structural and operating advantages.

An important object of the invention is the provision of a snap lock assembly which prevents accidental rotation of the latch member.

In connection with the foregoing object, it is another object of the invention to provide a snap lock assembly of the types set forth, wherein the anti-rotation means is selectively disengageable.

Still another object of the invention is the provision of a snap lock assembly of the type set forth, wherein the anti-rotation means serves as a position indicator.

It is another object of the invention to provide a ratchet assembly which includes a snap lock assembly of the type set forth.

These and other objects of the invention are attained by providing in a snap-lock assembly including a mounting body and a latch member reciprocatively movable with respect to the body between latching and unlatching positions, the improvement comprising: a retaining pin coupled to the latch member and movable therewith, the retaining pin being engageable with the mounting body when the latch member is disposed in its latching position for preventing rotational movement of the latch member with respect to the mounting body, the retaining pin being disposed out of engagement with the mounting body when the latch member is disposed in its unlatching position for accommodating rotational movement of the latch member with respect to the mounting body.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a snap lock assembly constructed in accordance with and embodying the features of the present invention, illustrated in its latching position;

FIG. 2 is an exploded perspective view of the snap lock assembly in FIG. 1;

FIG. 3 is an enlarged top plan view of the snap lock assembly of FIG. 1;

FIG. 4 is a reduced sectional view of a ratchet assembly incorporating the snap lock assembly of FIG. 1, with the snap lock assembly illustrated in top plan view;

FIG. 5 is a view in vertical section taken along the line 5—5 in FIG. 3, and illustrating the relationship with the ratchet assembly of FIG. 4; and FIG. 6 is a view similar to FIG. 5, illustrating the snap lock assembly in its unlatching position.

DESCRIPTION OF THE PREFERRED EMBODIMENT

Referring to FIGS. 4 and 5 there is illustrated a ratchet assembly, generally designated by the numeral 10, which includes two telescoping tubes. More specifically, the ratchet assembly 10 includes an outer tube 11 substantially square in transverse cross section and having an internally threaded bore 12 through one of the side walls 13 thereof. Telescopically received in the outer tube 11 coaxially therewith is an inner tube 15, which is also substantially square in transverse cross section. Formed in the outer surface 16 of one of the walls of the inner tube 15 is a longitudinally extending row of ratchet teeth 17, each of the ratchet teeth 17 including a ramp portion 18 which is inclined at an acute angle with respect to the outer surface 16 and a flat portion 19 which is disposed substantially perpendicular to the outer surface 16. The inner tube 15 is arranged so that the outer surface 16 thereof bearing the ratchet teeth 17 is disposed in facing relationship with the wall 13 of the outer tube 11 and in alignment with the bore 12 therethrough.

Referring now also to FIGS. 1-3, and 6, the ratchet assembly 10 includes a snap lock assembly 20 to control the movement of the inner tube 15 with respect to the outer tube 11. The snap lock assembly 20 includes a generally tubular mounting body 21 having a circularly cylindrical bore 22 extending axially therethrough and provided at one end thereof with a reduced-diameter portion 23 which extends through a circular end face 24 of the mounting body 21. The outer surface of the mounting body 21 is substantially hexagonal along the major portion of its length, defining six rectangular surface segments 25 intersecting along apices 26. The mounting body 21 is provided at the end thereof opposite the end face 24 with a reduced-diameter, externally threaded portion 27 which is adapted to be threadedly engaged in the bore 12 in the outer tube 11, as illustrated in FIGS. 4 and 5.

Disposed coaxially within the mounting body 21 is an elongated latch member 30, including a cylindrical shaft 31 which extends through the reduced-diameter portion 23 of the bore 22, and is integral at one end thereof with an enlarged-diameter head 32, truncated at the distal end thereof to define a cam surface 33 inclined with respect to the axis of the latch member 30. The shaft 31 is provided at its outer end with a reduced-diameter mounting lug 34 which extends outwardly beyond the end face 34 and is press-fitted into an axial bore 36 and in an enlarged hexagonal head 35, which has a maximum diametrical dimension substantially greater than that of the mounting body 21.

Extending through the hexagonal head 35 parallel to the bore 36 but eccentric with respect thereto is a bore 39, in which is press fitted an elongated retaining and indicating pin 40. More particularly, the pin 40 projects from the inner surface of the head 35 a predetermined distance, the pin 40 being positioned so that the radial distance from its outer surface to the axis of the latch member 30 is slightly greater than the radial distance between that axis and the longitudinal midline of one of the surface segments 25, but is less than the radial distance between the axis and one of the apices 26. A helical compression spring 37 is disposed in surrounding relationship with the shaft 31 and is trapped between the end face 24 and the head 32 for resiliently biasing the latch member 30 toward the right, as viewed in FIG. 5, to a latching position, wherein the cam surface 33 projects beyond the end of the mounting body 21 for ratcheting engagement with the ratchet teeth 17. The distance that the cam surface 33 projects from the mounting body 21 is limited by engagement of the head 35 with the end face 24. The latch member 30 is axially movable against the urging of the compression spring 37 to an unlatching position, illustrated in FIG. 6, wherein the cam surface 33 is completely retracted within the mounting body 21.

In operation, when the latch member 30 is disposed in its latching position, and the cam surface 33 is oriented as illustrated in the drawings, the cam surface 33 will be disposed for ratcheting engagement with the ratchet teeth 17. More specifically, the cam surface 33 will be disposed for mating engagement with the ramp portions 18 of the ratchet teeth 17. In this configuration, the bias spring 37 is yieldable to permit an axial retracting movement of the latching member 30, to accommodate a ratcheting cammed movement of the inner tube 15 past the latch member 30 in the direction of the arrow in FIG. 5. Engagement of the latch member 30 with the flat portions 19 of the ratchet teeth 17 prevents retrograde movement of the inner tube 15.

It will be appreciated that the pin 40 is disposed along the same side of the latch member 30 as is the cam surface 33, so that it will indicate the direction in which the cam surface 33 is facing. This permits the latch member 30 to be assembled accurately with the cam surface 33 facing in the correct direction for proper ratcheting engagement with the ratchet teeth 17. It will also be appreciated that when the latch member 30 is disposed in its latching position, the pin 40 lies along the longitudinal midline of one of the surface segments 25 closely adjacent thereto. Thus, the pin 40 is engageable with that surface segment 25 to effectively prevent significant rotational movement of the latch member 30 from its latching position with respect to the mounting body 21. This effectively prevents accidental movement of the cam surface 33 from its proper ratcheting orientation.

The head 35 may be manually grasped for completely retracting the latch member 30 against the urging of the spring 37 to the unlatching position illustrated in FIG. 6. In this position, the cam surface 33 is completely withdrawn from engagement with the ratchet teeth 17 to permit free sliding movement of the inner tube 15 with respect to the outer tube 11. As is best seen in FIG. 6, when the latch member 30 is disposed in its unlatching position, the inner end of the pin 40 clears the end face 24 of the mounting body 21, to permit free rotational movement of the latch member 30 with respect to the mounting body 21. This permits ready rotation of the latch member 30 to initially align the cam surface 33 for proper ratcheting engagement with the ratchet teeth 17.

From the foregoing, it can be seen that there has been provided an improved ratchet assembly and snap lock assembly therefor, which is of simple and economical construction, and which provides an accurate indication of the orientation of the latch member while at the same time preventing accidental rotation thereof from its proper ratcheting orientation.

I claim:

1. In a snap-lock assembly including a mounting body having an outer surface and a latch member reciprocatively movable with respect to the body between latching and unlatching positions, the improvement comprising: a pin coupled to the latch member and movable therewith, said pin being engageable with the outer surface of the mounting body when the latch member is disposed in its latching position for preventing rotational movement of the latch member with respect to the mounting body, said pin being disposed out of engagement with the mounting body when the latch member is disposed in its unlatching position for accommodating rotational movement of the latch member with respect to the mounting body.

2. The snap lock assembly of claim 1, and further including bias means resiliently urging the latch member to the latching position thereof.

3. The snap lock assembly of claim 1, wherein the mounting body is generally tubular in shape, the latch member being disposed coaxially within the mounting body.

4. The snap lock assembly of claim 3, wherein the latch member includes an enlarged head portion disposed externally of the mounting body and engageable therewith for limiting movement of the latch member toward its latching position.

5. The snap lock assembly of claim 4, wherein the outer surface of the mounting body is substantially hexagonal in transverse cross section.

6. The snap lock assembly of claim 5, wherein said pin is disposed in a complementary bore in said head portion and extends substantially parallel to the latch member along the outer surface of the mounting body.

7. The snap lock assembly of claim 6, wherein said pin is press-fitted in the bore in said head portion.

8. In a ratchet assembly including inner and outer telescoping members slidably movable axially with respect to each other with the inner member having a plurality of ratchet teeth, a mounting body secured to the outer member and having an outer surface, and a latch member having a cam surface and reciprocatively movable with respect to the mounting body between a latching position wherein the cam surface is disposed in ratcheting engagement with the ratchet teeth to permit ratcheting movement of the inner body in one direction while preventing axial movement of the inner body in the opposite direction, and an unlatching position disposed out of engagement with the ratchet teeth for accommodating axial movement of the inner member in either direction, the improvement comprising: a pin coupled to the latch member and movable therewith for indicating the orientation of the cam surface, said pin being engageable with the outer surface of the mounting body when the latch member is disposed in its latching position for preventing rotational movement of the latch member with respect to the mounting body, said pin being disposed out of engagement with the mounting body when the latch member is disposed in its unlatching position for accommodating rotational movement of the latch member with respect to the mounting body.

9. The ratchet assembly of claim 8, wherein each of the inner and outer members is substantially rectangular in transverse cross section.

10. The ratchet assembly of claim 8, wherein the mounting body is threadedly engaged with the outer telescoping member.

11. The ratchet assembly of claim 8, and further including bias means resiliently urging the latching member toward the latching position thereof.

12. The ratchet assembly of claim 8, wherein the mounting body is generally tubular in shape, the latch member being disposed coaxially within the mounting body.

13. The ratchet assembly of claim 12, wherein the latch member includes an enlarged head portion disposed externally of the mounting body and engageable therewith for limiting movement of the latch member toward its latching position.

14. The ratchet assembly of claim 13, wherein the mounting body has an outer surface which is substantially hexagonal in transverse cross section.

* * * * *